United States Patent [19]

Greeley et al.

[11] Patent Number: 5,430,858
[45] Date of Patent: Jul. 4, 1995

[54] METHOD FOR RAM CONSERVATION EMPLOYING A RAM DISK AREA NON-SEQUENTIAL ADDRESSES ON ARRANGED ORDER BASIS TO ACCESS EXECUTABLE PROCEDURES

[75] Inventors: Jeffrey A. Greeley, Cypress; Matthew L. Harmsen, Brea, both of Calif.

[73] Assignee: Northrop Grumman Corporation, Los Angeles, Calif.

[21] Appl. No.: 158,129

[22] Filed: Nov. 24, 1993

[51] Int. Cl.[6] .......................................... G06F 12/02
[52] U.S. Cl. .................................. 395/400; 395/425; 395/700; 364/DIG. 1; 364/280; 364/DIG. 2; 364/243.2
[58] Field of Search ... 364/200 MS File, 900 MS File; 395/400, 425, 700

[56] References Cited

U.S. PATENT DOCUMENTS

| | | | |
|---|---|---|---|
| 3,707,725 | 12/1972 | Dellheim | 371/19 |
| 4,450,521 | 5/1984 | McDonough et al. | 395/800 |
| 4,493,034 | 1/1985 | Angelle et al. | 395/700 |
| 4,677,586 | 6/1987 | Magar et al. | 395/575 |
| 5,053,949 | 10/1991 | Allison et al. | 395/375 |
| 5,117,492 | 5/1992 | Nash | 395/400 |
| 5,129,088 | 7/1992 | Auslander et al. | 395/700 |
| 5,257,370 | 10/1993 | Letwin | 395/650 |
| 5,367,661 | 11/1994 | Hough et al. | 395/500 |

Primary Examiner—Glenn Gossage
Assistant Examiner—Matthew Kim
Attorney, Agent, or Firm—Terry J. Anderson; Karl J. Hoch, Jr.

[57] ABSTRACT

A computer employs an operating system to perform a RAM conserving method that includes allocating a first portion of RAM for use as a RAM disk. The method comprises the steps of: storing an executable procedure comprising a plurality of sequentially executable code segments in the RAM disk, with code segments comprising the procedure stored at non-sequential addresses within the RAM disk and maintaining a file of RAM disk addresses where the sequential code segments are stored. The procedure then allocates a second portion of RAM as a procedure execution space and, in preparing to execute an executable procedure, stores in the procedure execution space, RAM disk addresses of code segments in the order they will execute during the executable procedure. The operating system then executes the executable procedure by employing the RAM disk code segment addresses in the executable space to access sequentially code segments from the RAM disk as required during execution of the executable procedure. In this manner, duplication of data in the RAM disk is avoided. A similar mapping technique is employed for files stored in the RAM disk.

5 Claims, 5 Drawing Sheets

METHOD FOR RAM CONSERVATION EMPLOYING A RAM DISK AREA NON-SEQUENTIAL ADDRESSES ON ARRANGED ORDER BASIS TO ACCESS EXECUTABLE PROCEDURES

GOVERNMENT LICENSE RIGHTS

The U.S. Government has a paid-up license in this invention and the right in limited circumstances to require the patent owner to license others on reasonable terms as provided for by the terms of contract No. F33657-81-C-0067 awarded by the United States Air Force.

FIELD OF THE INVENTION

This invention relates to computers having programming systems that organize portions of random access memory (RAM) into a disk file configuration (i.e. a RAM disk), and more particularly, to a method for conserving RAM space in a computer that employs a RAM disk.

BACKGROUND OF THE INVENTION

As is known, a computer stores information on external media such as hard disks and tape drives. During the computer's execution of a program, the information is retrieved from a disk and/or tape drive and is copied into the computer's RAM. Normally, a program will access a file located on a disk, allocate RAM for the file and then read data from the file on disk into RAM. When information is loaded into RAM, it is normally loaded in sequential address order so that, during execution, a program can sequence addresses and accomplish execution of a procedure. By contrast, information stored on a disk is often broken into segments and stored anywhere on the disk, not necessarily in sequential address order. To enable accessing of information stored on a disk, a directory file is maintained on the disk that provides a directory to disk address locations for the program segments that are stored therein. When a series of files are then to be loaded into RAM from a disk, the operating system accesses the directory file, finds the disk addresses of the required program segments and then accesses the segments from the disk, and loads them into RAM in the sequential order that they will be required during procedure execution.

Rather than employing actual disk drives to store information, some computers employ a "RAM disk" or, as it is sometimes otherwise known, a "virtual disk". In essence, a RAM disk is an area of RAM that is allocated by the computer's operating system and is employed as though it were an actual hard disk i.e., program segments are stored in various locations therein and a directory is maintained of where the various program segments can be found. Ordinarily, there is no attempt made to maintain any particular sequence of addresses of programs stored in a RAM disk.

Operating systems generally treat data accessed from a RAM disk exactly as it is treated when it is accessed from a hard disk. For instance, when information is accessed from either a RAM disk or a hard disk, it is inserted into an area of RAM allocated for use as a procedure execution space and is positioned so that address values of program segments are in sequential order. Thus, when the operating system causes information in the procedure execution space to be accessed, it is executed in the sequential address order that it is stored.

Because, as aforesaid, a RAM disk is treated exactly as a hard disk by an operating system, information from one part of RAM is duplicated and stored in another part of RAM in preparing to execute a procedure. As a result, two identical copies of program segments appear in RAM, one organized as data would be organized in a disk file (not necessarily sequential) and one organized in a procedure execution space, i.e., in sequential address locations. As a result, considerable RAM space becomes unavailable due to this duplication of data.

Accordingly, it is an object of this invention to provide a procedure which enables more efficient use of a computer's RAM space when that computer employs a RAM disk.

It is another object of this invention to provide a method for preventing duplication of information in a RAM when a RAM disk is being utilized.

SUMMARY OF THE INVENTION

A computer employs a software operating system to perform a RAM conserving method that includes allocating a first portion of RAM for use as a RAM disk. The method comprises the steps of: storing an executable procedure comprising a plurality of sequentially executable code segments in the RAM disk, with code segments comprising the procedure stored at non-sequential addresses within the RAM disk and maintaining a file of RAM disk addresses where the sequential code segments are stored. The procedure then allocates a second portion of RAM as a procedure execution space and, in preparing to execute an executable procedure, stores in the procedure execution space, RAM disk addresses of code segments in the order they will execute during the executable procedure. The operating system then executes the executable procedure by employing the RAM disk code segment addresses in the executable space to access sequentially code segments from the RAM disk as required during execution of the executable procedure. In this manner, duplication of data in the RAM disk is avoided. A similar mapping technique is employed for files stored in the RAM disk.

DETAILED DESCRIPTION OF THE INVENTION

This invention will be described in the context of a UNIX operating system, but it is to be understood by those skilled in the art that the invention is equally applicable to any operating system that employs a RAM disk structure and causes the RAM disk to be operated in a manner substantially identical to a physical disk.

In the UNIX operating system, a RAM may be allocated into various spaces, one of which is a procedure execution space and another of which is a RAM disk space. The procedure execution space is where a program is loaded sequentially from the RAM disk or physical disk, a page at a time. A page generally contains 4096 bytes. A Ram disk contains an image of a program stored in a non-contiguous "file system blocks". Each file system block is identified by a unique address and contains a predetermined number of bytes. Since a program must be loaded sequentially into the procedure execution space in order to run properly, the RAM disk maintains indices which the UNIX operating system utilizes to load the program, those indices enabling access to program segments having sequential address values.

An executable procedure (i.e. program) in RAM will comprise a number of sections. A Text section of the program contains the actual machine instructions that are to be executed by the computer hardware. A Data section of a program contains the program's initialized data values. A BSS section of a program contains unitialized data and is created when the program is loaded from a RAM disk or physical disk into the procedure execution space. A "Heap" section of a program is used for dynamic memory allocation when the program is executed. A "Stack" section of a program is used, dynamically, to keep track of function addresses.

Presently, when UNIX copies an executable procedure from either a physical disk or a RAM disk into a procedure execution space, it accesses sequential address values of the Text and Data portions of the program from the RAM disk. In other words, irrespective of where the Text and Data portions are stored in RAM disk, they are stored in the RAM's procedure execution space in sequential address order so as to be sequentially executable during execution time.

Figure 1:
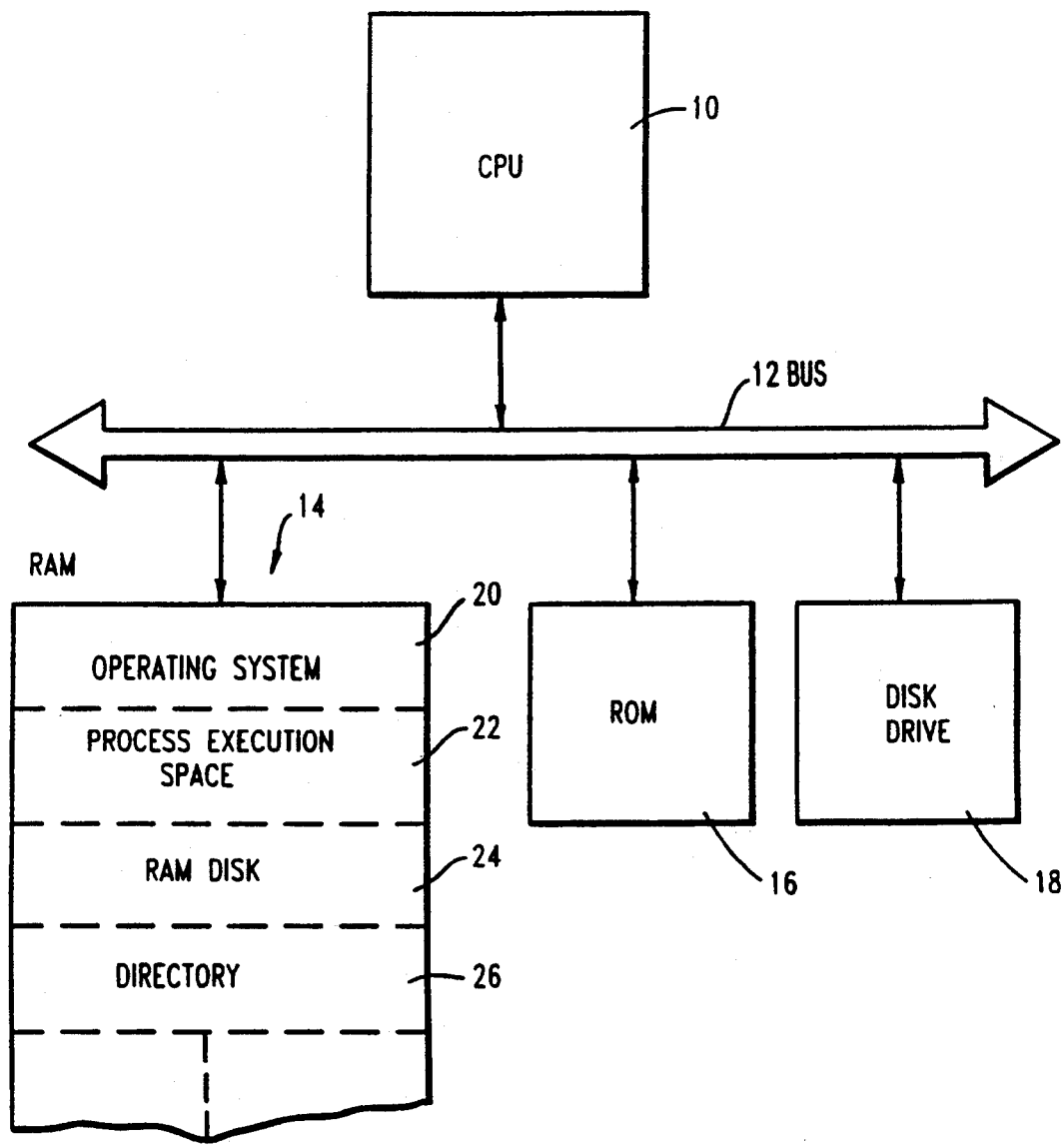
FIG. 1 is a block diagram of a system for performing the procedure of the invention.

Referring now to FIG. 1, an exemplary data processing system is shown for carrying out the invention. A central processing unit (CPU) 10 is connected via a bus 12 to a RAM 14 and read only memory (ROM) 16. The data processing system may also include a disk drive memory 18, however, as will be hereafter understood, data accessed from disk drive 18 is handled in a different manner than data accessed from a RAM disk within RAM 14. RAM 14 is segmented by an operating system contained in ROM 16 into a plurality of sections, a section 20 allocated for storage of the operating system code, a section 22 designated as a procedure execution space, and a section 24 that is allocated for use as a RAM disk. Within section 24 is a directory 26 that provides the data necessary to enable access to any code segments stored within the RAM disk section 24.

Figure 2:
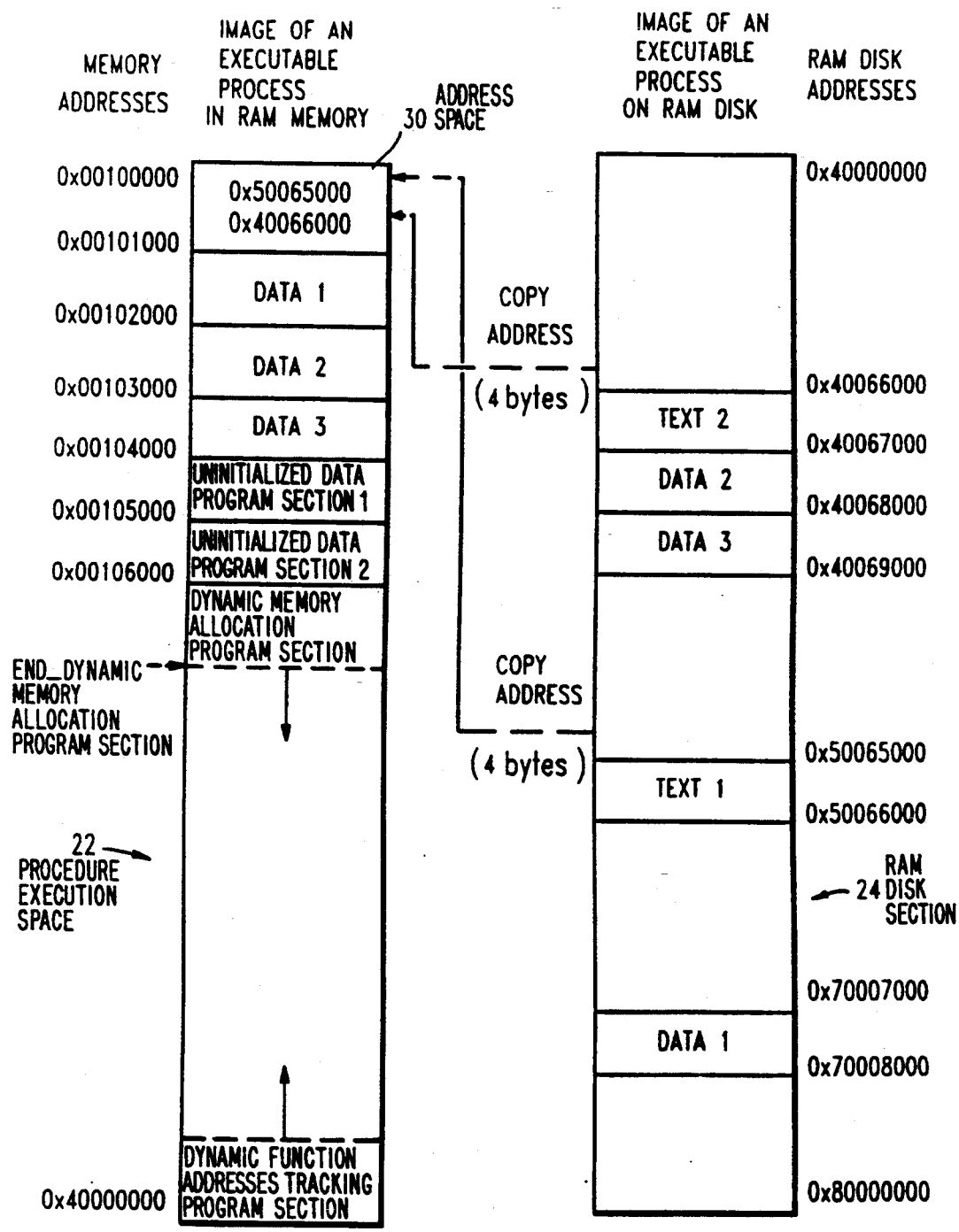
FIG. 2 is a schematic indication of an arrangement of information in both ordinary RAM memory and in a portion of RAM memory organized as a RAM disk.

Turning to FIG. 2, procedure execution space 22 and RAM disk section 26 are shown in expanded form. Adjacent to procedure execution space 22 are exemplary memory addresses to aid in an understanding of the invention. Similarly, adjacent to RAM disk section 24 are RAM disk addresses indicating where various Data and Text portions are stored therein. It will be recalled, that information stored in procedure execution space 22 must be stored in sequential address order to enable a procedure to execute properly.

Figure 3:
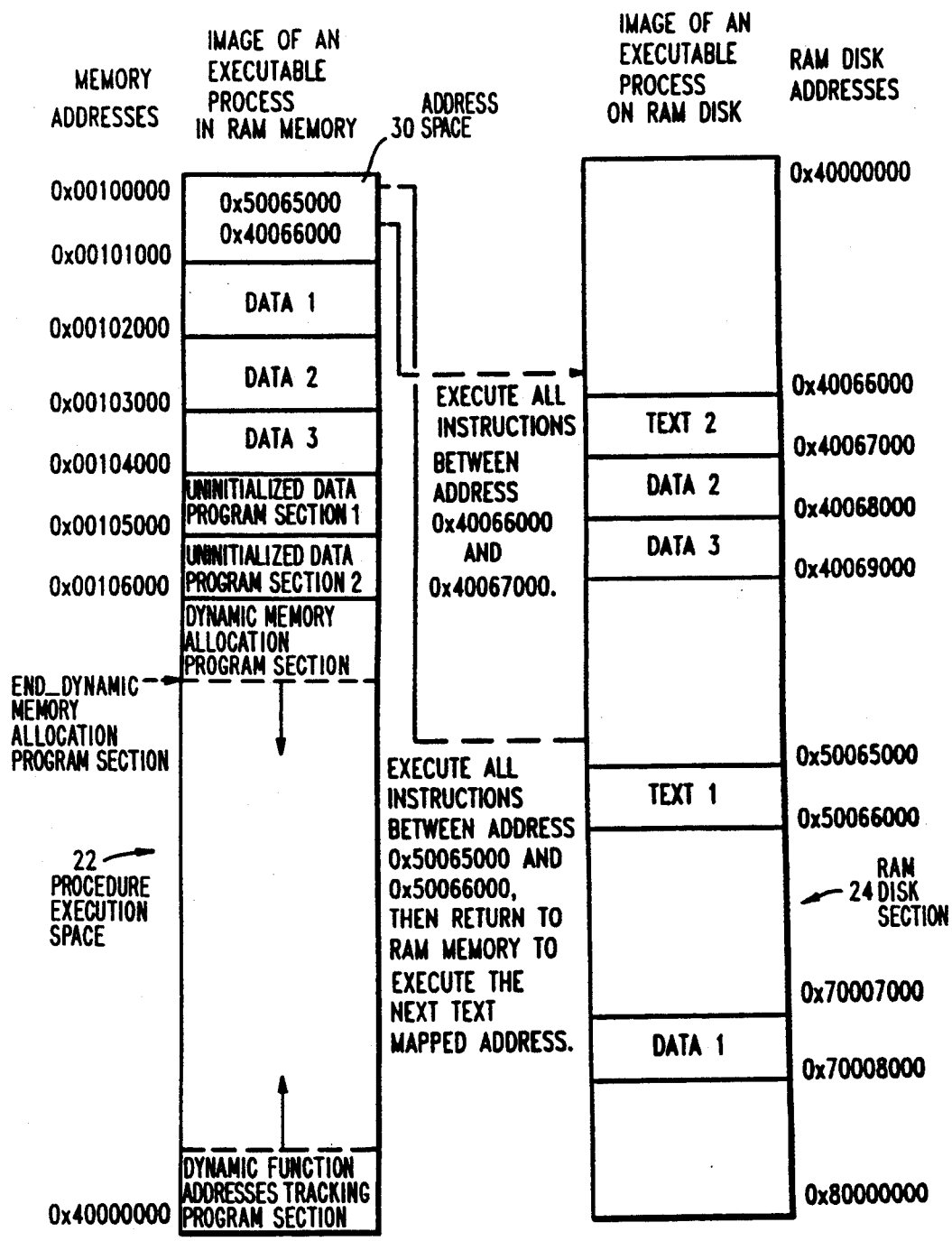
FIG. 3 illustrates how a procedure accesses data from information stored in a RAM disk during execution of a procedure, from code stored in a procedure execution space of RAM.

Previously, Text 1 and Text 2 sections from RAM disk 24 would have been copied, in total, into uppermost address space 30 within procedure execution space 22. By contrast, the operating system of this invention accesses only the initial address of the Text 1 code segment from Ram disk 24 and places it into address space 30, followed by the initial address of Text 2 code segment. This procedure is repeated for each Text code segment until address space 30 contains the initial addresses (and lengths) of each Text code segment listed in sequential order. Then, as shown in FIG. 3, during execution, the operating system in proceeding through address space 30, initially comes upon the address of the Text 1 code segment, jumps to that address in RAM disk 24 and executes the machine instructions directly from the RAM disk. More specifically, the operating system executes all instructions between address 0x50065000 and 0x50066000 and then returns to procedure execution space 22 (and address space 30) to execute a next Text-mapped address from RAM disk 24. Specifically, that is the Text 2 code segment from RAM disk 24. This procedure continues until all Text code segments have been executed.

Figure 4:
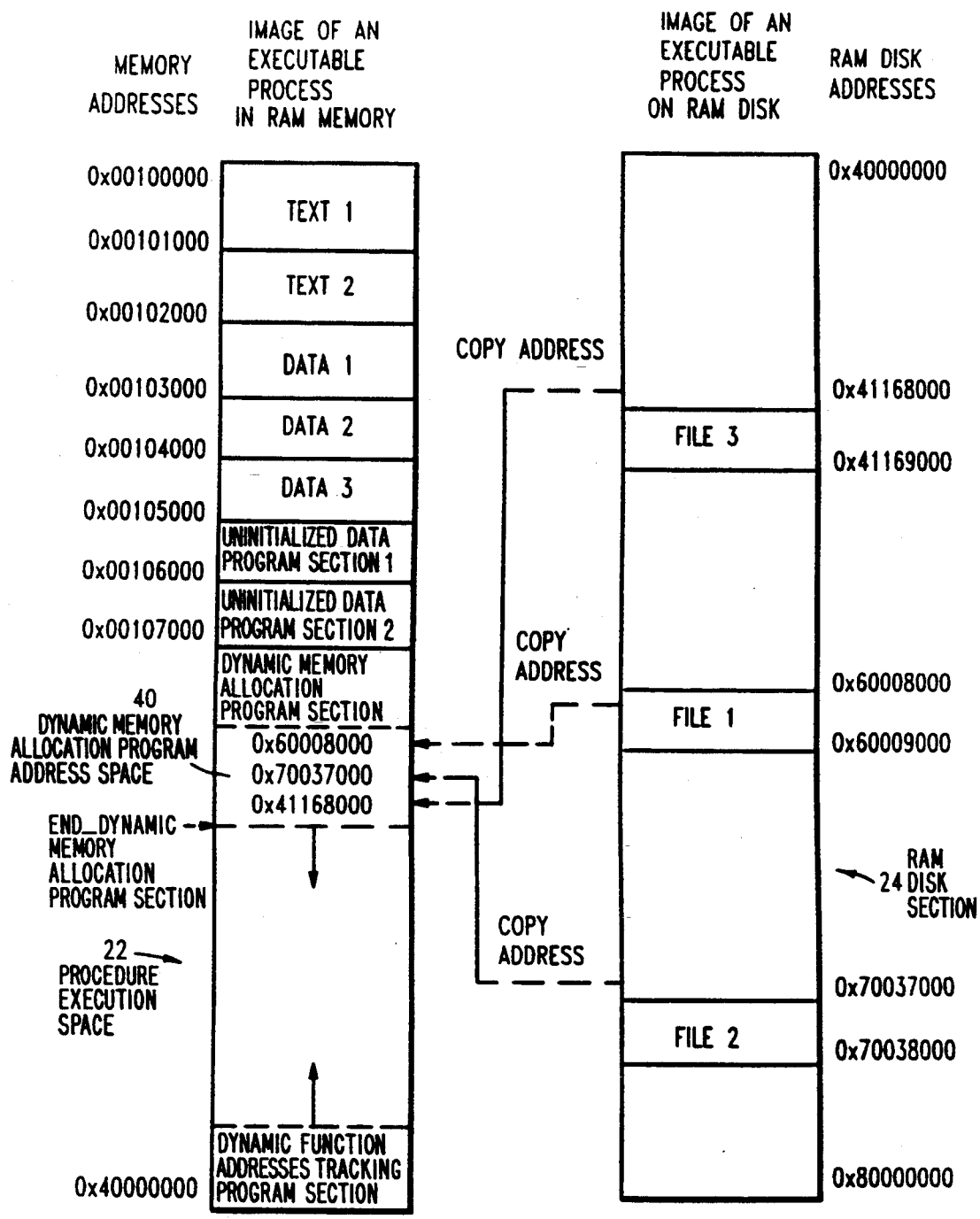
FIG. 4 is a schematic indicating a cross referencing of files from a RAM disk into an executable process stored in RAM.

A similar procedure may be used to conserve RAM when accessing files from a RAM disk. Presently, UNIX loads files from a RAM disk directly into the area within procedure execution space 22 that has been allocated for storage of the Heap. There, files are located in sequential order and data therefrom is directly addressed. Referring to FIG. 4, the above noted UNIX procedure is modified by causing address space 40, that is allocated for use as Heap storage, to contain the addresses of the files from the Ram disk rather than the files themselves. Thus, the addresses of files 1, 2 and 3 are loaded into Heap address space 40 in the order in which the files will be employed. The address of file 1 (i.e., 0x60008000) is loaded into address space 40 followed by the addresses of file 2 and of file 3.

Figure 5:
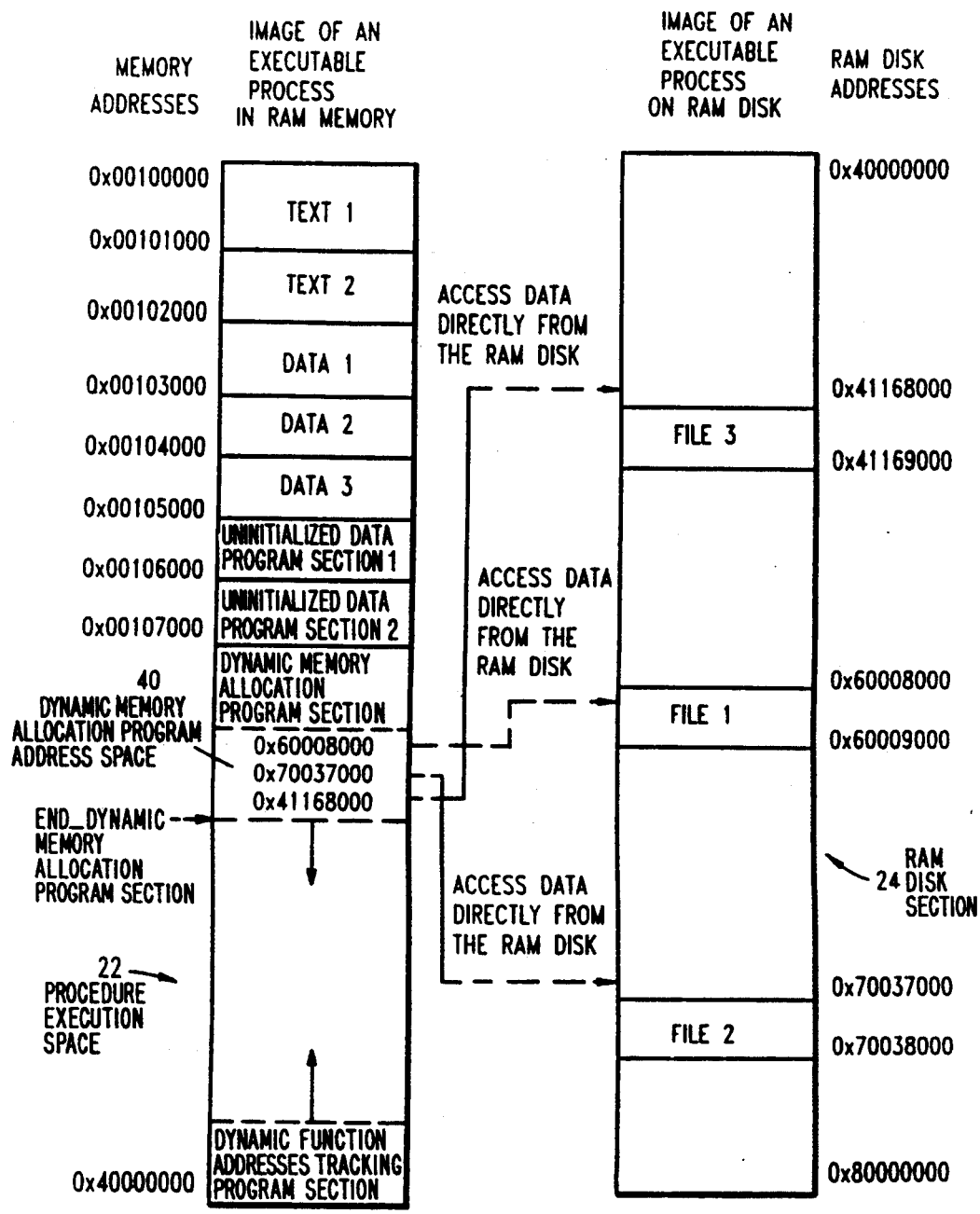
FIG. 5 illustrates how an executable process accesses files from RAM disk during execution of a procedure.

Then, as shown in FIG. 5, when the procedure executes, and a particular file is required, the address of that file is accessed from Heap address space 40 and the data from the file is accessed directly from RAM disk 24. In this manner, duplication in RAM of information stored in a RAM disk is avoided and greater RAM usage efficiency is achieved.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A computer including random access memory (RAM) and an operating system, in combination performing a RAM-conserving method that includes allocating a first area of said RAM for use as a RAM-disk, said method comprising the steps of:

storing an executable procedure comprising a series of code segments in said RAM-disk area, said code segments stored at non-sequential addresses within said RAM disk area and maintaining a file of said non-sequential RAM disk area addresses that enables location of said code segments;

allocating a second area of said RAM as a procedure execution space;

preparing to execute said executable procedure by storing in said procedure execution space, RAM disk area addresses of code segments of said executable procedure arranged in an order that enables said code segments to be accessed in a sequence that said code segments are to be executed during said executable procedure; and executing said executable procedure by accessing RAM disk area addresses in their arranged order in said procedure execution space and further accessing executable code segments in said RAM disk employing said accessed RAM disk area addresses.

2. The method as recited in claim 1 wherein said RAM disk area addresses in said procedure execution space are arranged in address value order.

3. The method as recited in claim 1, wherein code lines comprising each code segment are accessed from said RAM disk area in segment code line address order.

4. The method as recited in claim 1 wherein said operating system is UNIX and text file code segments for said executable procedure are stored in said RAM disk area, said UNIX operating system inhibited from copying said Text file code segments into said procedure execution space during execution of said procedure.

5. The method as recited in claim 4 wherein data files for said executable procedure are stored in said RAM disk area, said operating system inhibited from copying said data files into said process execution space during execution of said executable procedure.

* * * * *